United States Patent
Zhou et al.

(10) Patent No.: US 10,454,517 B2
(45) Date of Patent: Oct. 22, 2019

(54) CIRCUITS FOR REDUCING OUT-OF-BAND-MODULATED TRANSMITTER SELF-INTERFERENCE

(71) Applicant: The Trustees of Columbia University in the City of New York, New York, NY (US)

(72) Inventors: Jin Zhou, New York, NY (US); Harish Krishnaswamy, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 15/117,664

(22) PCT Filed: Feb. 10, 2015

(86) PCT No.: PCT/US2015/015217
§ 371 (c)(1),
(2) Date: Aug. 9, 2016

(87) PCT Pub. No.: WO2015/167648
PCT Pub. Date: Nov. 5, 2015

(65) Prior Publication Data
US 2016/0359521 A1    Dec. 8, 2016

Related U.S. Application Data

(60) Provisional application No. 61/938,133, filed on Feb. 10, 2014.

(51) Int. Cl.
*H04B 1/525* (2015.01)
*H04B 1/12* (2006.01)

(52) U.S. Cl.
CPC ............... *H04B 1/525* (2013.01); *H04B 1/12* (2013.01); *H04B 1/123* (2013.01)

(58) Field of Classification Search
CPC ........... H04B 1/123; H04B 1/525; H04B 1/12
(Continued)

(56) References Cited

U.S. PATENT DOCUMENTS 7,177,341 B2 * 2/2007 McCorkle ................ H04B 1/69
375/130
7,902,923 B2    3/2011 Li et al.
(Continued)

OTHER PUBLICATIONS

Andrews et al., "A Passive Mixer-First Receiver with Digitally Controlled and Widely Tunable RF Interface," in IEEE Journal of Solid-State Circuits, vol. 45, No. 12, Dec. 2010, pp. 2696-2708.
(Continued)

*Primary Examiner* — Eugene Yun
(74) *Attorney, Agent, or Firm* — Byrne Poh LLP (57) ABSTRACT

Circuits for reducing out-of-band-modulated transmitter self-interference are provided. In some embodiments, receivers are provided, the receivers comprising: a low noise amplifier (LNA) having an input, a first output, and a second output, wherein the LNA includes: a common source transistor having a gate coupled to an input signal, a drain coupled to the first output of the LNA, and a source coupled to ground; and a common gate transistor having a gate coupled to a transmitter replica signal, a source coupled to the gate of the common source transistor, and a drain coupled to the second output of the LNA.

13 Claims, 5 Drawing Sheets

(58) Field of Classification Search
USPC .......................................................... 455/78
See application file for complete search history.

(56) References Cited

U.S. PATENT DOCUMENTS

| | | | | |
|---|---|---|---|---|
| 8,045,946 | B2* | 10/2011 | Roo ........................ | H04B 1/581 |
| | | | | 455/278.1 |
| 8,138,835 | B2* | 3/2012 | Zeng ..................... | H03F 1/0205 |
| | | | | 330/149 |
| 8,410,856 | B2 | 4/2013 | Kuo et al. | |
| 9,048,786 | B2* | 6/2015 | Pehlivanoglu ....... | H03D 7/1458 |
| 2010/0259319 | A1* | 10/2010 | Chan ....................... | H03F 1/565 |
| | | | | 327/563 |
| 2014/0162580 | A1* | 6/2014 | Leung .................... | H04B 17/00 |
| | | | | 455/226.1 |

OTHER PUBLICATIONS

Aparin et al., "A New Method of TX Leakage Cancelation in W/CDMA and GPS Receivers," In the Proceedings of the IEEE RFIC Symposium, Jun. 2008, pp. 87-90.
Aparin et al., "An Integrated LMS Adaptive Filter of TX Leakage for CDMA Receiver Front Ends", IEEE Journal Solid-State Circuits, vol. 41, No. 5, May 2006, pp. 1171-1182.
Aparin et al., "Analysis and Reduction of Cross-Modulation Distortion in CDMA Receivers", In IEEE Transactions on Microwave Theory Technology, vol. 51, No. 5, May 2003, pp. 1591-1602.
Avago Technologies, "ACMD-7612 Miniature UMTS Band i Duplexer Data Sheet", Technical Paper, Data Sheet, Sep. 25,2007, pp. 1-12.
Ayazian et al., "Feedforward Interference Cancellation in Radio Receiver Front-Ends," in IEEE Transactions on Circuits and Systtems—II, vol. 54, No. 10, Oct. 2007, pp. 902-906.
Balankutty et al., "An Ultra-Low Voltage, Low-Noise, High Linearity 900-MHz Receiver with Digitally Calibrated In-Band Feed-Forward Interferer Cancellation in 65-nmCMOS," in IEEE Journal of Solid-State Circuits, vol. 46, No. 10, Oct. 2011, pp. 2268-2283.
Blaakmeer et al., "Wideband Balun-LNA with Simultaneous Output Balancing, Noise-Canceling and Distortion-Canceling," in IEEE Journal of Solid-State Circuits, vol. 43, No. 6, Jun. 2008, pp. 1341-1350.
Borremans et al., "A 40 nm CMOS 0.4-6 GHz Receiver Resilient to Out-of-Band Blockers," In IEEE Journal of Solid-State Circuits, vol. 46, No. 7, Jul. 2011, pp. 1659-1671.
Bruccoleri et al., "Wide-Band CMOS Low-Noise Amplifier Exploiting Thermal Noise Canceling", In IEEE Journal of Solid-State Circuits, vol. 39, No. 2, Feb. 2004, pp. 275-282.
Chen et al., "A Highly Linear Broadband CMOS LNA Employing Noise and Distortion Cancellation", In IEEE Journal of Solid-State Circuits, vol. 43, No. 5, May 2008, pp. 1164-1176.
Darabi et al., "A Blocker Filtering Technique for SAW-less Wireless Receivers", in IEEE Journal of Solid-State Circuits, vol. 42, No. 12, Dec. 2007, pp. 2766-2773.
Darvishi et al., "Design of Active N-Path Filters," In IEEE Journal of Solid-State Circuits, vol. 48, No. 12, Dec. 2013, pp. 2962-2976.
Darvishi et al., "Widely Tunable 4th Order Switched Gm-c Band-Pass Filter Based on N-path Filters," In IEEE Journal of Solid-State Circuits, vol. 47, No. 12, Dec. 2012, pp. 3105-3119.
Fabiano et al., "SAW-less Analog Front-End Receivers for TDD and FDD", IEEE Journal of Solid-State Circuits, vol. 48, No. 12, Dec. 2013, pp. 3067-3079.
Feng et al., "Digitally Assisted IIP2 Calibration for CMOS Direct-Conversion Receivers," In IEEE Journal of Solid-Stale Circuits, vol. 46, No. 10, Oct. 2011, pp. 2253-2267.
Ghaffari et al., "Tunable High-Path Band-Pass Fillers: Modeling and Verification", In IEEE Journal of Solid-State Circuits, vol. 46, No. 5, May 2011, pp. 998-1010.
International Preliminary Report on Patentability dated Aug. 25, 2016 in International Patent Application No. PCT/US2015/015217.

International Search Report and Written Opinion dated Oct. 23, 2015 in International Application No. PCT/US2015/015217.
Jongh et al., "A Low-Cost Closed-Loop Antenna Tuner Module for Mobile Phone Single-Feed Multi-Band Antennas," in the Proceedings of the European Microwave Conference, Oct. 2013, pp. 1171-1174.
Joshi el al., "Tunable High Q Narrow-Band Triplexer," in IEEE MTT-S International Microwave Symposium Digest, Jun. 2009, pp. 1477-1480.
Kaczman, et al., "A Single Chip 10-Band WCDMA/HSDPA 4-Band GSM/EDGE SAW-less CMOS receiver with DIGRF 3G Interface an +90dBm IIP2", In IEEE Journal of Solid-State Circuits, vol. 44, No. 3, Mar. 2009, pp. 718-739.
Kaltiokallio et al., "A 1 to 5 GHz Adjustable Active Polyphase Filter for LO Quadrature Generation," In the Proceedings of the IEEE RFIC Symposium, Jun. 2011, pp. 1-4.
Kaukovuori et al., "Analysis and Design of Passive Polyphase Filters," IEEE Transactions on Circuits and Systems—I, vol. 55, No. 10, Nov. 2008, pp. 3023-3037.
Khatri et al., "An Active Transmitter Leakage Suppression Technique for CMOS SAW-less CDMA Receivers," In IEEE Journal of Solid-State Circuits, vol. 45, No. 8, Aug. 2010, pp. 1590-1601.
Kim et al., "A Highly Linear SAW-less CMOS Receiver Using a Mixer with Embedded TX Filtering for CDMA", In IEEE Journal of Solid-State Circuits, vol. 44, No. 8, Aug. 2009, pp. 2126-2137.
Kuo et al., "A Digital-Calibrated Transmitter-to-Receiver Isolator in Radar Applications", in IEEE Microwave and Wireless Components Letters, vol. 22, No. 12, Dec. 2012, pp. 651-653.
Low et al., "Low-Cost PCB Antenna for Low-Cost PCB Antenna for UWB Applications," In IEEE Antennas and Wireless Propagation Letters, vol. 4, No. 1, Dec. 2005, pp. 237-239.
Mahrof et al., "A Receiver with In-Band IIP3 >20dBm, Exploiting Cancelling of Opamp Finite-Gain-Induced Distortion via Negative Conductance," In the Proceedings of the IEEE RFIC Symposium, Jun. 2013, pp. 85-88.
Mirzaei et al., "A Low-Power Process-Scalable Super-Heterodyne Receiver with Integrated High-Q Filters", In IEEE Journal of Solid-State Circuits, vol. 46, No. 12, Dec. 2011, pp. 2920-2932.
Mirzaei et al., "A 65 nm CMOS Quad-band SAW-less Receiver SoC for GSM/GPRS/EDGE", In IEEE Journal of Solid-State Circuits, vol. 46, No. 4, Apr. 2011, pp. 950-964.
Mirzaei et al., "Architectural Evolution of Integrated M-phase High-Bandpass Filters," In IEEE Transactions on Circuits and Systems—I, vol. 59, No. 1, Jan. 2012, pp. 52-65.
Murphy et al., "A Blocker-Tolerant, Noise-Cancelling Receiver Suitable for Wideband Wireless Applications," in IEEE Journal of Solid-State Circuits, vol. 47, No. 12, Dec. 2012, pp. 2943-2963.
Omer et al., "A PA-Noise Cancellation Technique for Next Generation Highly Integrated RF Front-Ends", In the Proceedings of the IEEE RFIC Symposium, Jun. 2012, pp. 471-474.
Oualkadi et al. "Fully Integrated High-Switched Capacitor Bandpass Filter with Center Frequency and Bandwidth Tuning", In the Proceeding of the IEEE RFIC Symposium, Jun. 2007, pp. 681-684.
Park et al., "A 20 mW GSM/WCDMA Receiver with RF Channel Selection", in IEEE International Solid-State Circuits Conference on Digital Technologies Papers, Feb. 2014, pp. 356-357.
Razavi, B., "RF Microelectronics", 2nd Edition, Pearson, 2011, pp. 1-59.
Ru et al., "Digitally Enhanced Software-Defined Radio Receiver Robust to Out-of-Band Interference", in IEEE Journal of Solid-State Circuits, vol. 44, No. 12, Dec. 2009, pp. 3359-3375.
Safarian et al., "Integrated Blocker Filtering RF Front Ends", In the Proceedings of the IEEE RFIC Symposium, Jun. 2007, pp. 13-16.
Skyworks Solutions, "SKYFR-000709: 2110-2170 MHz Single Junction Robust Lead Circulator", Technical Paper, Data Sheet, May 7,2013, pp. 1-4.
Soer et al., "A 0.2-10-2.0 GHz 65 nm CMOS Receiver Without LNA Achieving >11 dBm IIP3 and <6.5 dB nF," In IEEE International Solid-State Circuits Conference on Digital Technology Papers, Feb. 2009, pp. 222-223.
Swanberg et al., "WCDMA Cross Modulation Effects and Implications for Receiver Linearity Requirements", in the Proceedigns of the IEEE Radio Wireless Conference, Aug. 2002, pp. 13-18.

(56) References Cited

OTHER PUBLICATIONS

Yu et al., "A SAW-less GSM/GPRS/EDGE Receiver Embedded in 65-nm SoC", IEEE Journal of Solid-State Circuits, vol. 46, No. 12, Dec. 2011, pp. 3047-3060.
Zhang et al., "Linearization Techniques for CMOS Low Noise Amplifiers: A Tutorial," In IEEE Transactions on Circuits and Systems—I, vol. 58, No. 1, Jan. 2011, pp. 22-36.
Zhou et al., "A Blocker-Resilient Wideband Receiver with Low-Noise Active Two-Point Cancellation of >0 dBm TX Leakage and TX Noise in RX Band for FDD/Co-existence", in IEEE International Solid-Slate Circuits Conference Digest Technical Papers, Feb. 2014, pp. 352-353.
Zhu et al., "Field-Programmable LNAs with Interferer-Reflecting Loop for Input Linearity Enhancement", IEEE Journal of Solid-State Circuits, in IEEE Journal of Solid-Stale Circuits, vol. 50, No. 2, Feb. 2015, pp. 556-572.

\* cited by examiner

CIRCUITS FOR REDUCING OUT-OF-BAND-MODULATED TRANSMITTER SELF-INTERFERENCE

CROSS REFERENCE TO RELATED APPLICATION

This application claims the benefit of U.S. Provisional Patent Application No. 61/938,133, filed Feb. 10, 2014, which is hereby incorporated by reference herein in its entirety.

STATEMENT REGARDING GOVERNMENT FUNDED RESEARCH

This invention was made with government support under contract HR0011-12-1-0006 awarded by Defense Advanced Research Projects Agency. The government has certain rights in the invention.

BACKGROUND

A major trend in wireless communication systems is the investigation of radio-frequency (RF) transceivers that can be widely tuned across frequency bands. However, wideband receiver front-ends have to handle interference signals that are much larger than those in conventional narrowband receivers due to the lack of tunable high-front-end RF filters.

Out-of-band-modulated transmitter self-interference (or TX leakage) due to reduced antenna/duplexer isolation in many circuits imposes challenges, including cross-modulation, second-order inter-modulation and TX noise in the receiver (RX) band.

Accordingly, circuits for reducing out-of-band-modulated transmitter self-interference are desirable.

SUMMARY

In accordance with some embodiments, circuits for reducing out-of-band-modulated transmitter self-interference are provided. In some embodiments, receivers are provided, the receivers comprising: a low noise amplifier (LNA) having an input, a first output, and a second output, wherein the LNA includes: a common source transistor having a gate coupled to an input signal, a drain coupled to the first output of the LNA, and a source coupled to ground; and a common gate transistor having a gate coupled to a transmitter replica signal, a source coupled to the gate of the common source transistor, and a drain coupled to the second output of the LNA.

DETAILED DESCRIPTION

In accordance with some embodiments, circuits for reducing out-of-band-modulated transmitter self-interference are provided.

Figure 1:
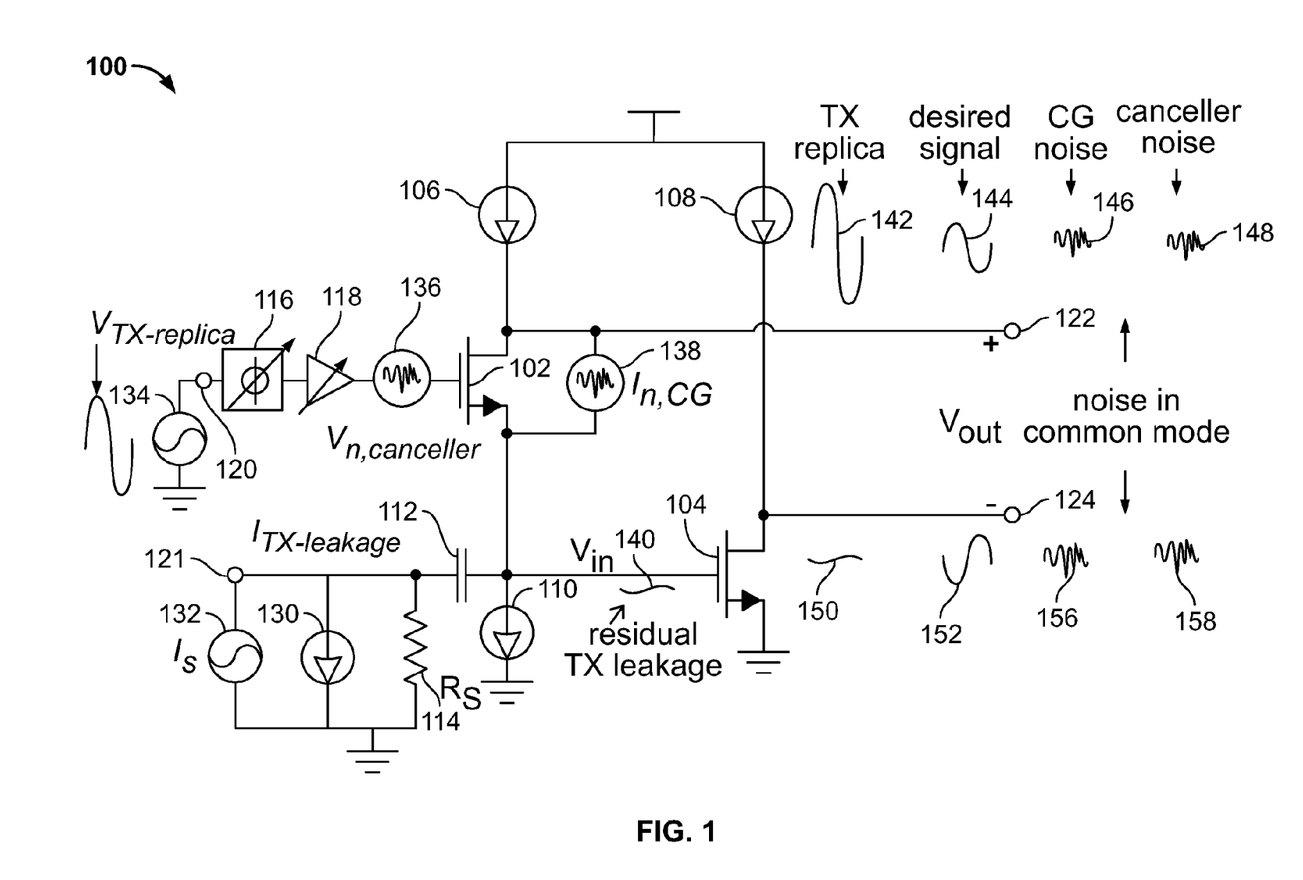
FIG. 1 is a block diagram of circuit for cancelling transmitter leakage in accordance with some embodiments of the disclosed subject matter.

Turning to FIG. 1, an example 100 of a circuit for reducing out-of-band-modulated transmitter self-interference in accordance with some embodiments is illustrated. As shown, circuit 100, includes a common gate (CG) transistor 102, a common source (CS) transistor 104, a current source 106, a current source 108, a current source 110, an DC blocking capacitor 112, a resistor ($R_S$) 114 representing the source impedance looking back into the antenna interface, a variable phase rotator 116, a variable gain amplifier (VGA) 118, a replica input node 120, a signal input node 121, a positive output node 122, and a negative output node 124.

During operation of circuit 100, an input signal ($I_S$) coupled to signal input node 121 from signal source 132 drives the gate of CS transistor 104 via DC blocking capacitor 112 and across source resistor ($R_S$) 114. The input signal may be provided from any suitable source, such as one or more antennas, in some embodiments. Based on the proximity, strength, and frequency of a signal from a separate transmitter circuit (not shown), a transmitter leakage current ($I_{TX-leakage}$) may also be induced at signal input node 121 as represented by transmitter leakage current source 130.

To counter this transmitter leakage current, a transmitter replica signal ($V_{TX-replica}$) from signal generator 134 can be applied to replica input node 120. The phase of the replica signal can then be rotated by variable phase rotator 116 and amplified or attenuated by VGA 118. The output of VGA 118 drives the gate of CG transistor 102. A canceller noise signal ($V_{n,canceller}$) is also present at the gate of CG transistor 102 as a result of noise from variable phase rotator 116 and VGA 118.

Using Kirchhoff's current law, the current at signal input node 121, when considering only the transmitter leakage current, can be represented as:

$$g_{m,CG}(A_{canceller}V_{TX-replica}-V_{in})=I_{TX-leakage}+(V_{in}/R_S)$$

where $g_{m,CG}$ is the trans-conductance of CG transistor 102 and $A_{canceller}$ is the voltage gain of the combination of phase rotator 116 and VGA 118. If the phase rotator and the VGA are adjusted so that $g_{m,CG}A_{canceller}V_{TX-replica}=I_{TX-leakage}$, then $V_{in}=0$, indicating the transmitter leakage voltage swing can be eliminated at the LNA input.

When transmitter leakage cancellation takes place, the source node of CG transistor 102 can be a virtual ground for the transmitter replica signal, and therefore the CG transistor is not degenerated by source resistor ($R_S$) 114 and any other resistance present at input node 121.

The noise from the combination of the phase rotator, the VGA, and the CG transistor, which, as stated above, can be represented by voltage source 136 ($V_{n,canceller}$) and current source 138 ($I_{n,CG}$), can be cancelled as a result of CS transistor 104 sensing this noise and presenting it at negative output terminal 124 (as represented by canceller noise 158 in FIG. 1) so that it matches (and thus cancels out) the corresponding noise presented at positive output terminal 122 (as represented by canceller noise 148 in FIG. 1).

Current sources 106 and 110 provide a DC biasing current for the CG transistor, and current source 108 provides a DC biasing current for the CS transistor.

Figure 2:
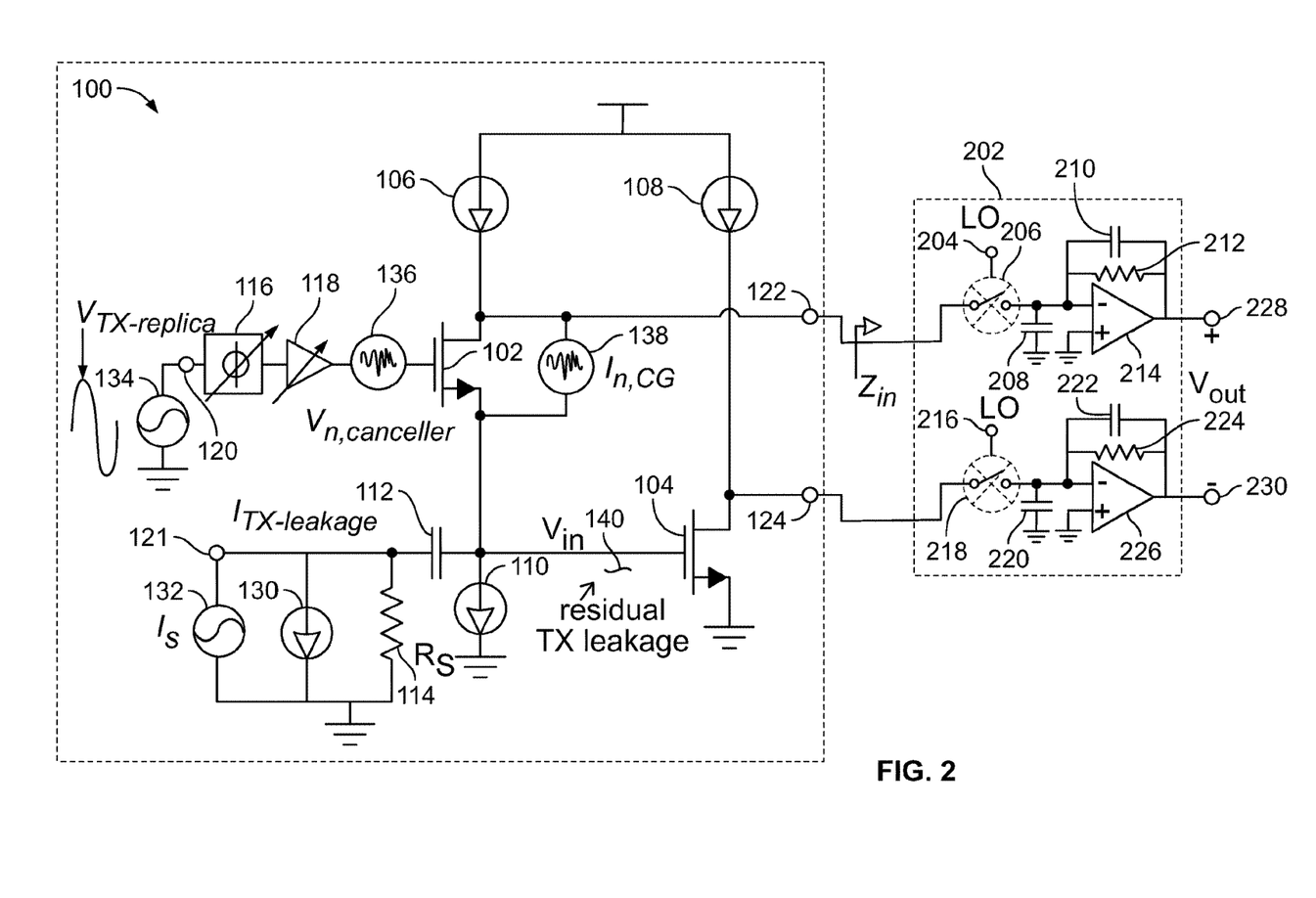
FIG. 2 is a block diagram of circuit for cancelling transmitter leakage, showing a sub-circuit for mixing output signals with a local oscillator and filtering the mixed signals with a trans-impedance amplifier, in accordance with some embodiments of the disclosed subject matter.

While the transmitter leakage current ($I_{TX\text{-}leakage}$) is mostly cancelled at the input, a large leakage current still flows through CG transistor 102 producing a large voltage swing ($I_{TX\text{-}leakage}R_{CG}$) at the positive output node as represented by transmitter replica signal 142. To mitigate this, as shown in FIG. 2, a current-mode down conversion stage 202 with impedance transfer from baseband that includes passive mixers 206 and 218 and baseband trans-impedance amplifiers (TIAs) (formed from amplifier 214, capacitor 210, and resistor 212 and from amplifier 226, capacitor 222, and resistor 224) can be inserted before a combining network (not shown in FIG. 2) to be attached at output nodes 228 and 230 to filter out the large out-of-band leakage current before the achievement of voltage gain. As shown, passive mixers 206 and 218 combine the signals from nodes 122 and 124 with a local oscillator signal (LO) present at LO input nodes 204 and 216, respectively. As also shown, capacitors 208 and 220 may be present at the inputs of amplifiers 224 and 226, respectively, to block out-of-band signals.

In some embodiments, mixers 206 and 218 can be implemented using MOS transistor switches, as represented by the switch schematic symbol in the schematic mixer symbol in FIG. 2.

As shown by signals 140 and 150 in FIG. 1, residual transmitter leakage may be present at the gate of transistor 104 and negative output node 124 in some embodiments. This residual transmitter leakage may be the result of mismatches between the $V_{TX\text{-}replica}$ signal (and/or the product of it and the phase shift and/or amplification (or attenuation) provided by devices 116, 118, and/or 102).

As shown by signals 144 and 152, the desired signal (i.e., the signal resulting from the amplification of $I_S$ from input source 132) may be presented differentially at positive output node 122 and the negative output node 124. Because these differential signals are 180 degrees out of phase, when combined into a single-ended signal, the single-ended signal will have double that of the two differential signals.

It should be note that reference numbers 130, 132, 134, 136, 138, 140, 142, 144, 146, 148, 150, 152, 156, and 158 do not represent actual components of circuit 100, but rather represent signals (e.g., a noise signal, modulation, leakage, etc.) and/or sources of those signals.

Figure 3:
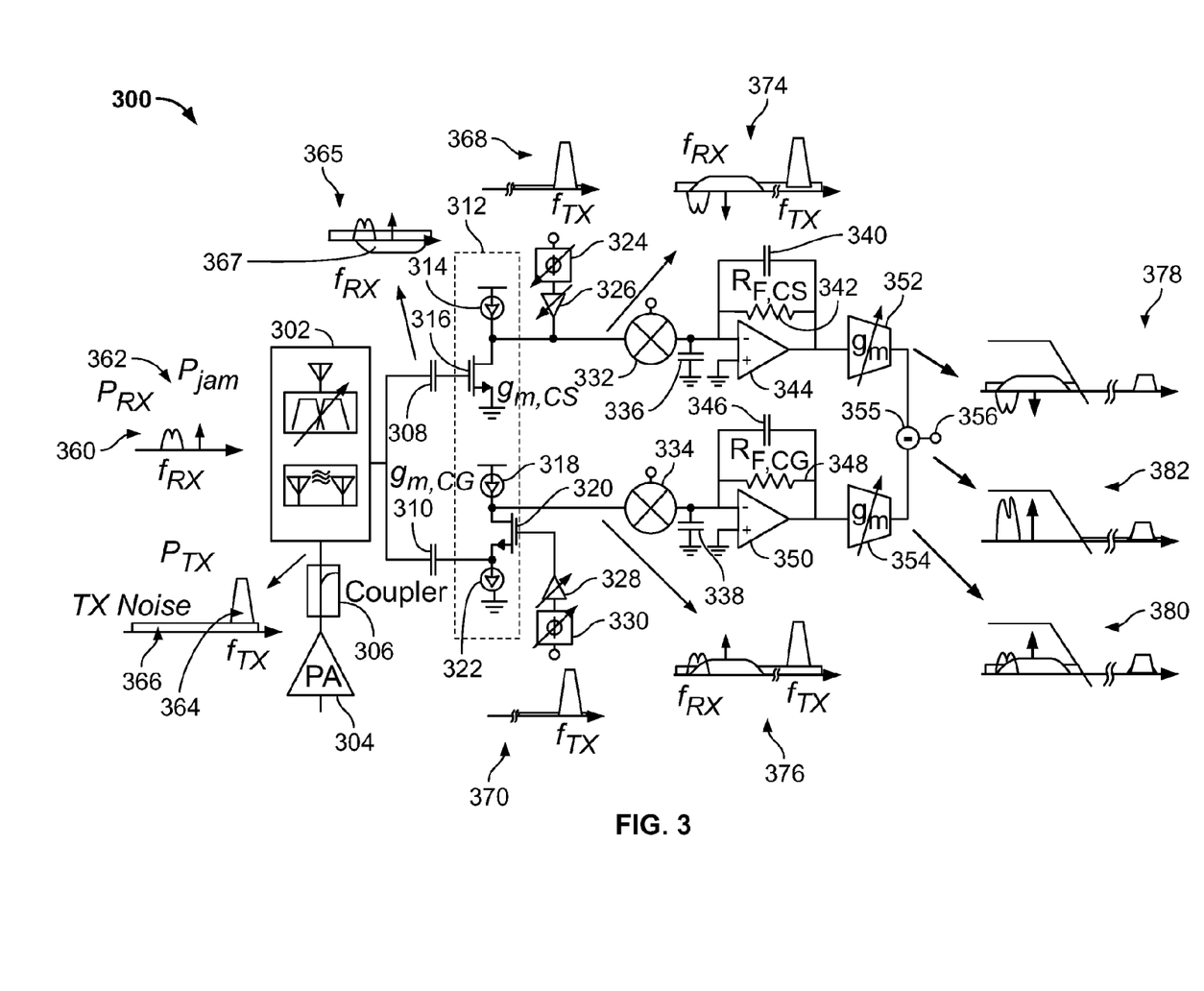
FIG. 3 is a block diagram of a circuit for cancelling transmitter leakage include an injection of a transmitter replica signal in a common source path in accordance with some embodiments of the disclosed subject matter.

Turning to FIG. 3, an alternate view of the circuits of FIGS. 1 and 2 in accordance with some embodiments is shown. As illustrated, circuit 300 includes antenna(s) 302, a power amplifier 304, a coupler 306, DC blocking capacitors 308 and 310, a low noise amplifier 312 (comprising a current sources 314, 318, and 322, a common source (CS) transistor 316, and a common gate (CG) transistor 320), variable phase rotators 324 and 330, variable gain amplifiers 326 and 328, mixers 332 and 334, bypass capacitors 336 and 338, amplifiers 344 and 350, capacitors 340 and 346, resistors 342 and 348, variable trans-conductance amplifiers 352 and 354, and a differential amplifier 355.

Like with the circuits of FIGS. 1 and 2, in circuit 300, a desired receiver signal 360 may be received by antenna(s) 302. One or more continuous wave (CW) jammers 362 may also be received via the antenna(s) 302. As a result of coupling (represented by coupler 306) of a nearby transmitter signal from power amplifier 304, a transmitter leakage 364 and receiver-band transmitter noise 366 may also be present at antenna(s) 302.

A transmitter replica signal 370 can be provided to the gate of CG transistor 320 via variable phase rotator 330 and variable gain amplifier 328 (which can adjust the phase and the amplitude of the replica signal). As a result of this, the replica signal can then be presented at the gate of CS transistor 316 via DC blocking capacitors 308 and 310 from the source of CG transistor 320. By adjusting the phase and gain of rotator 330 and VGA 328, respectively, the replica signal can cancel out the transmitter leakage at the gate of CS transistor 316. As a result, as shown in 365, the signals at the gate of the CS transistor now include desired receiver signal 360, CW jammer(s) 362, transmitter noise 366, and cross modulation distortion 367 from CG transistor 320, but without transmitter leakage.

Similarly, as a result of transmitter replica signal 370 being injected at the gate of CG transistor 320, as shown in 376, desired receiver signal 360, CW jammer(s) 362, transmitter noise 366, cross modulation distortion 367, and transmitter replica signal 370 may appear at the input to mixer 334 from the drain of CG transistor 320. The cross-modulation distortion from the CG transistor also appears at the gate of the CS transistor, as mentioned above. To cancel the receiver-band transmitter noise, transmitter replica signal 368 can also be injected in to the CS path between the drain of CS transistor 316 and the input to mixer 332 via variable phase rotator 324 and VGA 326. As a result, desired receiver signal 360, CW jammer(s) 362, transmitter noise 366, cross modulation distortion 367, and transmitter replica signal 368 may appear in the CS path as shown at 374. As a result of filtering of the replica signals in the CS path and the CG path, at the output of variable transconductors 352 and 354, the signals in the paths may be as shown in 378 and 380, respectively. Following a combining of these signals by differential amplifier 355, transmitter noise 366 and cross modulation distortion 367 may be cancelled-out as shown by 382 at node 356.

Figure 4:
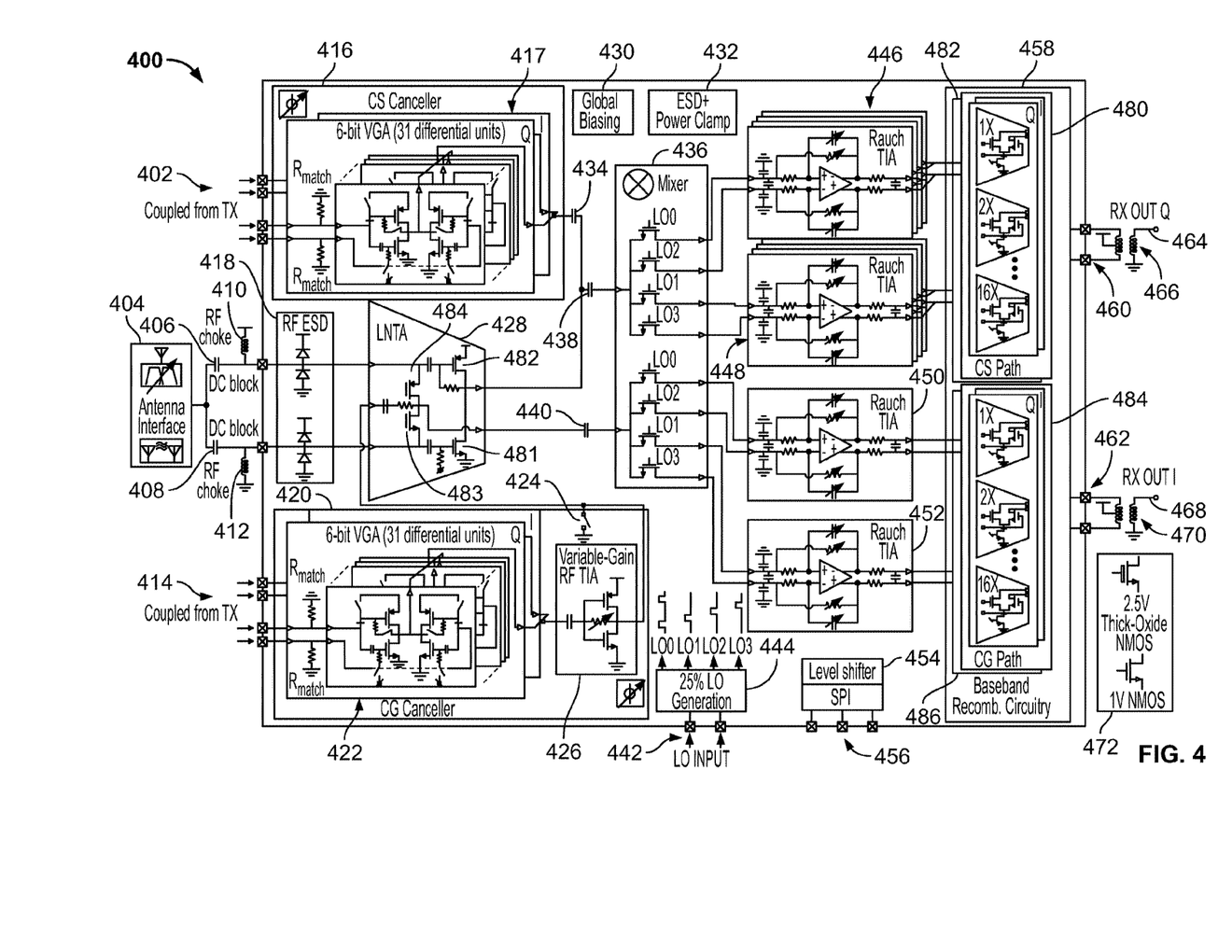
FIG. 4 is a schematic of receiver circuit that cancels transmitter leakage in accordance with some embodiments of the disclosed subject matter.

Turning to FIG. 4, a detailed schematic of a receiver circuit 400 implemented on a chip in accordance with some embodiments is shown. As illustrated, circuit 400 includes a differential low noise trans-conductance amplifier (LNTA) 428. Like what is shown in FIGS. 1-3, this LNTA includes CS transistors 481 and 482 and CG transistors 483 and 484. A desired receiver signal is provided by antenna(s) 404 to the gates of transistors 481 and 482 connected to the inputs of the LNTA via DC blocking capacitors 406 and 408 and DC blocking capacitors in LNTA 428. RF chokes 410 and 412 may also be provided to minimize out-of-band signals at the inputs to the LNTA. RF ESD diodes 418 may be provided to protect the inputs of the LNTA from electrostatic discharge.

A transmitter replica signal is provided by CG canceller 420 to the gates of transistors 483 and 484 (via DC blocking capacitors in LNTA 428).

The drains of transistors 481 and 482 are connected and provide a CS output of the LNTA to mixer 436 via DC blocking capacitor 438. The drains of transistors 483 and 484 are connected and provide a CG output of the LNTA to mixer 436 via DC blocking capacitor 440. As with the CS output of circuit 100 of FIG. 3 (shown at the drain of CS transistor 316), a transmitter replica signal is injected at the CS output of LNTA 428 by CS canceller 416.

The CS output and the CG output of LNTA 428 are mixed by mixer 444 with local oscillator (LO) signals from local oscillator generator 444. Mixer 444 can be any suitable mixer in some embodiments. For example, mixer can be a four phase, current-driven mixer in some embodiments. In some embodiments, any suitable number of phases can be mixed by mixer 444 For example, eight phases can be mixed, instead of four, to provide a better noise figure, in some embodiments. As shown, when implemented with four phases, the LO generator can generate the LO signals as four 25% non-overlapping LO signals based on a reference LO signal received at LO inputs 442.

The outputs of mixer 436 can then be provided to second-order Rauch trans-impedance amplifiers (TIAs) 446, 448, 450, and 452. Large input shunt capacitors in the Rauch TIAs can be used to help sink out-of-band transmitter leakage current in the TIAs.

As illustrated, Rauch TIAs 446 and 448 may each be implemented as four TIAs (or any other suitable number of TIAs) while Rauch TIAs 450 and 452 may each be implemented as only one TIA (or any other suitable number of TIAs) to compensate for weighting of the CS transistors' trans-conductance (e.g., in this case 80 mS) to the CG transistors' trans-conductance (e.g., in this case 20 mS). Rauch TIAs 446 and 450 can be used for the I channel, while Rauch TIAs 448 and 452 can be used for the Q channel.

The outputs from the Rauch TIAs can be provided to programmable recombination circuitry 458 to combine the receiver outputs from the CG output and the CS output for noise and cross-modulation distortion cancellation.

As shown circuitry 458 can include four sub-circuits 480, 482, 484, and 486. Sub-circuit 480 is connected to the outputs of Rauch TIA 446, sub-circuit 482 is connected to the outputs of Rauch TIA 448, sub-circuit 484 is connected to the outputs of Rauch TIA 450, and sub-circuit 486 is connected to the outputs of Rauch TIA 452. Within each of these sub-circuits, there is sub-sub-circuit for the I channel and the Q channel. Within each of these sub-sub-circuits, five (or any other suitable number) binary weighted selectable transconductors can be provided to weight the output of the corresponding Rauch TIA in a corresponding one the output 464 and 468. For example, for Rauch TIA 446, one or more of the transconductors labelled 1x, 2x, 4x, 8x, and 16 in the I channel in sub-sub-circuit 480 can be selected and the selected transconductors can determine the contribution of Rauch TIA 446 to output 468. Likewise, as another example, for Rauch TIA 446, one or more of the transconductors labelled 1x, 2x, 4x, 8x, and 16 in the Q channel in sub-sub-circuit 480 can be selected and the selected transconductors can determine the contribution of Rauch TIA 446 to output 464.

The outputs of the Q sub-sub-circuits of circuitry 458 can be connected to outputs 460, which combine together via transformer 466 to provide Q receiver output 464. Similarly, the outputs of the I sub-circuits of circuitry 458 can be connected to outputs 462, which combine together via transformer 470 to provide I receiver output 468.

Global biasing circuitry 430 may be provided, as known in the art, to generate biasing circuits in circuit 400 in accordance with some embodiments.

ESD and power clamp circuitry 432 may be provided, as known in the art, to protect circuit 400 from electrostatic discharge and over-voltage conditions in accordance with some embodiments.

Level shifter, series-to-parallel-interface SPI circuitry 454 may be provided to program the entire receiver through a single series interface in accordance with some embodiments. Series control signal may be connected to inputs 456 in accordance with some embodiments.

As shown by legend 472 in FIG. 4, in some embodiments, some devices of circuit 400 can be implemented in 2.5V thick oxide NMOS (e.g., to handle large transmitter leakage) and some devices of circuit 400 can be implemented in 1V NMOS. In some embodiments, the devices can be implemented in any other suitable technologies. In some embodiments, circuit 400 can be implemented in 65 nm CMOS or any other suitable technology.

In accordance with some embodiments, CG canceller 420 and CS canceller 416 each can include a Cartesian phase rotator 422 and 417, respectively, which each includes two (one for I and one for Q) 6-bit variable-gain trans-conductance amplifiers (VGAs). For the CG canceller, an RF variable-gain TIA (VG-TIA) 426 can be inserted between LNTA CG transistors 483 and 484 and phase rotator 422 for gain variation and current-to-voltage conversion in some embodiments. Note that, in some embodiments, in the Cartesian phase rotators, the magnitude of the output current can also be modified through the VGAs at the expense of phase resolution. The phase-rotator VGAs can be built using inverter-based trans-conductance cells for high linearity in some embodiments.

Figure 5:
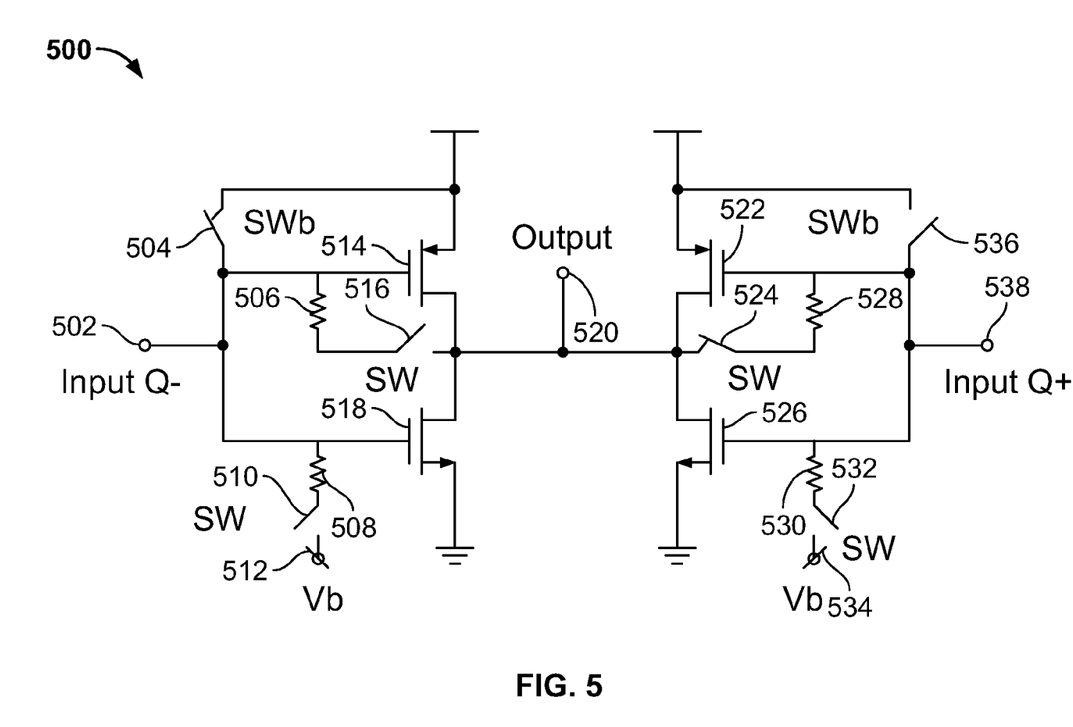
FIG. 5 is a schematic of a variable gain amplifier that can be used in a common gate canceller and/or a common source canceller in accordance with some embodiments of the disclosed subject matter.

Turning to FIG. 5, an example 500 of a VGA circuit that can be used in CG canceller 420 and CS canceller 416 in accordance with some embodiments is illustrated. As shown, circuit 500 receives input signals at nodes 500 and 538. The input signals are provided to the gates of transistors 514 and 518 and transistors 522 and 524, respectively. The drains of transistors 514, 518, 522, and 524 are all connected to output node 520. A bias voltage is provided to nodes 512 and 534.

Under the control of a switch (SW) signal and a switch-bar (SWb) signal, switches 5084, 510, 516, 524, 532, and 536 control the gain of the amplifier formed by these components.

Any suitable devices may be used to implement the transistors, the switches, and the resistors (i.e., resistors 506, 508, 528, and 530) of circuit 500 in some embodiments.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Although the invention has been described and illustrated in the foregoing illustrative embodiments, it is understood that the present disclosure has been made only by way of example, and the numerous changes in the details of implementation of the invention can be made without departing from the spirit and scope of the invention, which is only limited by the claims which follow. Features of the disclosed embodiments can be combined and rearranged in various ways.

What is claimed is:

1. A receiver comprising:
 a low noise amplifier (LNA) having an input to the LNA, a first output from the LNA, and a second output from the LNA, wherein the LNA includes:
  a common source transistor having a gate coupled to an input signal, a drain directly connected to the first output of the LNA, and a source coupled to ground; and
  a common gate transistor having a gate coupled to a transmitter replica signal, a source coupled to the gate of the common source transistor, and a drain connected to the second output of the LNA,
 wherein the transmitter replica signal is based on a signal transmitted from a transmitter.

2. The receiver of claim 1, further comprising a variable-gain amplifier coupled to the gate of the common gate transistor that amplifies the transmitter replica signal.

3. The receiver of claim 1, further comprising a variable-gain radio frequency trans-impedance amplifier coupled to the gate of the common gate transistor that amplifies the transmitter replica signal.

4. The receiver of claim 1, further comprising a phase rotator coupled to the gate of the common gate transistor that adjusts the phase of the transmitter replica signal.

5. The receiver of claim 1, further comprising a variable-gain amplifier coupled to the drain of the common source transistor that amplifies the transmitter replica signal.

6. The receiver of claim 1, further comprising a multi-phase mixer that has a first input and a second input, that mixes the first output of the LNA and the second output of the LNA each with a different phase of a multi-phase local oscillator signal, and that provides a plurality of outputs.

7. The receiver of claim 6, further comprising a plurality of Rauch trans-impedance amplifiers (TIAs) each having an input and an output, wherein:
the input of each of a first at least one of the plurality of Rauch TIAs is coupled to at least one of the plurality of outputs of the multi-phase mixer; and
the input of each of a second at least one of the plurality of Rauch TIAs is coupled to at least another of the plurality of outputs of the multi-phase mixer.

8. The receiver of claim 7, further comprising:
a first plurality of selectable transconductance amplifiers, each with a different weighting, coupled to the output of each of the first at least one of the plurality of Rauch TIAs; and
a second plurality of selectable transconductance amplifiers, each with a different weighting, coupled to the output of each of the second at least one of the plurality of Rauch TIAs.

9. The receiver of claim 6, wherein each different phase of the multi-phase local oscillator signal is equally shifted in phase.

10. The receiver of claim 1, wherein the transmitter leakage is cancelled at the gate of the common source transistor.

11. The receiver of claim 1, wherein a desired signal is out-of-phase at the first output and the second output of the LNA.

12. The receiver of claim 1, further comprising:
a variable-gain amplifier coupled to the gate of the common gate transistor that amplifies the transmitter replica signal;
a variable-gain radio frequency trans-impedance amplifier coupled to the gate of the common gate transistor that amplifies the transmitter replica signal; and
a phase rotator coupled to the gate of the common gate transistor that adjusts the phase of the transmitter replica signal,
wherein noise produced in the common gate transistor, the variable-gain amplifier, the variable-gain radio frequency trans-impedance amplifier, and the phase rotator is in-phase at the first output and the second output of the LNA.

13. The receiver of claim 1, wherein cross-modulation distortion produced in the common gate transistor is in-phase at the first output and the second output of the LNA.

* * * * *